US006243530B1

(12) United States Patent
Kato (10) Patent No.: US 6,243,530 B1
(45) Date of Patent: Jun. 5, 2001

(54) RECORDING DEVICE, VIDEO OUTPUT DEVICE, VIDEO DISPLAY/RECORD SYSTEM AND SIGNAL PROCESSING METHOD FOR VIDEO DISPLAY/RECORD SYSTEM

(75) Inventor: Naoki Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/985,779

(22) Filed: Dec. 5, 1997

(30) Foreign Application Priority Data

Jun. 12, 1996 (JP) .................................................. 8-326682

(51) Int. Cl.[7] ...................................................... H04N 5/91
(52) U.S. Cl. ............................... 386/94; 386/46; 348/474; 348/705
(58) Field of Search .................................... 386/1, 94, 96, 386/46, 52, 64; 360/60; 380/5, 10, 22; 348/474, 558, 554–556, 233, 705–706; 345/132; H04N 5/91

(56) References Cited

U.S. PATENT DOCUMENTS

| 4,808,992 | * | 2/1989 | Beyers, Jr. et al. | 340/825.24 |
| 5,255,097 | * | 10/1993 | Spiero et al. | 358/181 |
| 5,436,618 | * | 7/1995 | Van Steenbrugge | 340/825.25 |
| 5,742,285 | * | 4/1998 | Ueda | 345/342 |
| 5,815,631 | * | 9/1998 | Sugiyama et al. | 386/46 |
| 5,883,613 | * | 3/1999 | Iwaki | 345/132 |

FOREIGN PATENT DOCUMENTS 8-51856    11/1996   (JP) .

\* cited by examiner

Primary Examiner—Wendy Garber
Assistant Examiner—Vincent F. Boccio (57) ABSTRACT

In a recording device (1), a switching portion (19) is supplied with an ID signal from an identification signal generating portion (21) in a video display device (2) through a connector output portion (8). The switching portion (19) is also supplied with an ID signal outputted from an identification signal generating portion (15) in the recording device (1). When the ID signal indicating the video display device (2) is outputted from a return identification signal distinguishing portion (17) to a recording standby signal generating portion (18), the switching portion (19) is switched to the side-b so that the ID signal inputted to the recording device (1) is outputted to the outside as it is. The ID signal passed through the recording device (1) is inputted to an identification signal input portion (41) in an analog video signal output processing portion (4). When a recording standby ON signal is inputted from a recording standby switch (16) into the recording standby signal generating portion (18), the switching portion (19) is switched to the side-a independently of presence/absence of the signal input from the return identification signal distinguishing portion (17) so that the ID signal of the recording device (2) is outputted to the outside from the identification signal generating portion (15).

12 Claims, 8 Drawing Sheets

| PIN No. | DISPLAY ADAPTER CONNECTOR |
|---|---|
| 81 | VIDEO RED |
| 82 | VIDEO GREEN |
| 83 | VIDEO BLUE |
| 84 | MONITOR ID BIT 2 |
| 85 | DDC RETURN (FOR PINS 89,92,95) |
| 86 | VIDEO RED RETURN |
| 87 | VIDEO GREEN RETURN |
| 88 | VIDEO BLUE RETURN |
| 89 | +5V SUPPLY (OPTION) |
| 90 | SYNC RETURN |
| 91 | MONITOR ID BIT 0 |
| 92 | DATA FROM DISPLAY |
| 93 | HORIZONTAL SYNC |
| 94 | VCLK (VERTICAL SYNC) |
| 95 | MONITOR ID BIT 3 |

| RESOLUTION | SETABLE TIMING | | | MONITOR A | MONITOR B | MONITOR C | MONITOR D |
|---|---|---|---|---|---|---|---|
| | NUMBER OF DISPLAY COLORS | HORIZONTAL SCAN FREQUENCY (kHz) | VERTICAL SCAN FREQUENCY (Hz) | | | | |
| 640×480 | 16.7M,65K,256 | 31.5 | 60 | ○ | ○ | ○ | ○ |
| 640×480 | 16.7M,65K,256 | 37.9 | 72 | ○ | ○ | ○ | ○ |
| 640×480 | 16.7M,65K,256 | 39.4 | 75 | ○ | ○ | ○ | ○ |
| 640×480 | 16.7M,65K,256 | 52.4 | 100 | ○ | × | ○ | ○ |
| 800×600 | 16.7M,65K,256 | 35.2 | 56 | ○ | ○ | ○ | ○ |
| 800×600 | 16.7M,65K,256 | 37.9 | 60 | ○ | ○ | ○ | ○ |
| 800×600 | 16.7M,65K,256 | 46.9 | 75 | ○ | ○ | ○ | ○ |
| 800×600 | 16.7M,65K,256 | 62.7 | 100 | ○ | ○ | ○ | ○ |
| 1024×768 | 65K,256 | 35.4 | 87 | ○ | ○ | ○ | ○ |
| 1024×768 | 65K,256 | 48.4 | 60 | ○ | ○ | ○ | ○ |
| 1024×768 | 65K,256 | 56.5 | 70 | ○ | ○ | ○ | ○ |
| 1024×768 | 65K,256 | 60.0 | 75 | ○ | ○ | ○ | ○ |
| 1024×768 | 65K,256 | 80.6 | 100 | ○ | ○ | × | ○ |
| 1152×864 | 256 | 56.7 | 60 | ○ | ○ | ○ | ○ |
| 1152×864 | 256 | 66.9 | 70 | ○ | ○ | ○ | ○ |
| 1152×864 | 256 | 76.6 | 80 | ○ | ○ | × | ○ |
| 1280×1024 | 256 | 50.3 | 94 | ○ | ○ | ○ | ○ |
| 1280×1024 | 256 | 63.9 | 60 | ○ | ○ | ○ | ○ |
| 1280×1024 | 256 | 73.9 | 70 | ○ | ○ | × | × |
| 1280×1024 | 256 | 79.0 | 75 | ○ | ○ | × | × |
| 1600×1200 | 256 | 62.4 | 98 | ○ | × | ○ | ○ |
| 1600×1200 | 256 | 76.6 | 60 | ○ | × | × | ○ |
| 1600×1200 | 256 | 79.6 | 62 | ○ | × | × | ○ |

○ ⋯ DISPLAYABLE

FIG. 6

RECORDING DEVICE, VIDEO OUTPUT DEVICE, VIDEO DISPLAY/RECORD SYSTEM AND SIGNAL PROCESSING METHOD FOR VIDEO DISPLAY/RECORD SYSTEM

BACKGROUND OF THE INVENTION

1. Field of the Invention

The present invention relates to recording devices, video output devices, video display/record systems, and signal processing methods for video display/record systems, and particularly to a recording device, a video output device, a video display/record system, and a signal processing method for the video display/record system capable of identifying devices connected to the video output device.

2. Description of the Background Art

Example of a common device for outputting RGB video is a video system adapted to the DDC (Display Data Channel) standard (fully described later), whereby a video I/F system which is adopted in a personal computer system or the like and is capable of outputting video signals and making bi-directional communication between a video display device and a video output device.

Such a video system includes video output equipment having a plurality of video output modes to limit the video signal output mode according to performance specifications of the display device connected thereto more specifically, the video output. Equipment can change the displayable range of the video signal in accordance with specifications of the display device.

The above-mentioned DDC standard by VESA (Video Electronics Standard Associate) will now be described. The DDC standard is a system for enabling equipment (e.g., a display device) connected to the RGB terminal of a computer to send information including the displayable resolution range of the monitor to the computer.

Suppose that video outputted to the analog RGB output terminal of the video output device, such as a computer, is recorded. In this case, the devices may be connected as shown in FIG. 8, for example.

Figure 8:
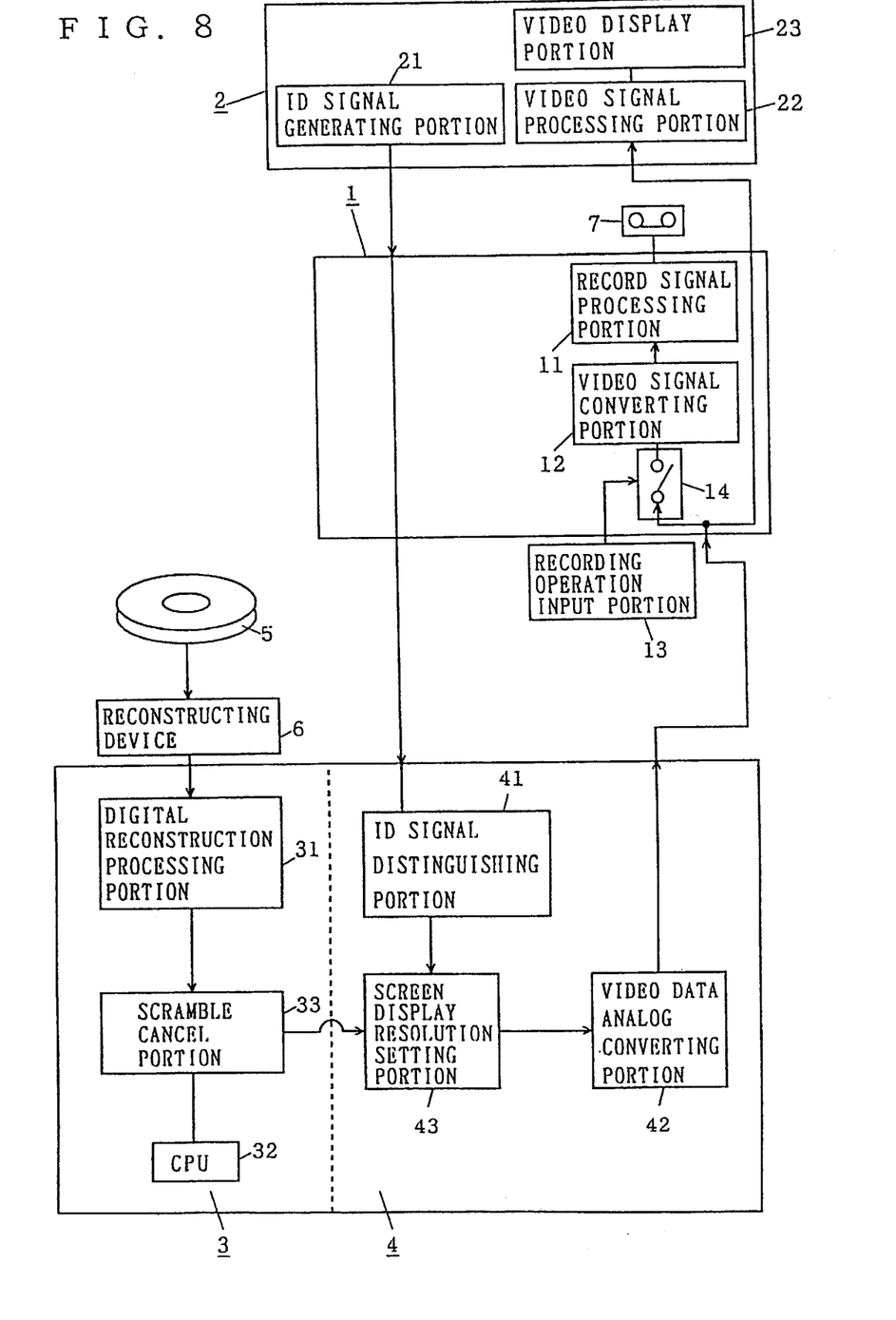
FIG. 8 is a diagram showing a conventional video display system.

FIG. 8 shows a conventional structure for connecting a video display device and a video output device, wherein the video output device and the display device are directly connected, with a recording device additionally connected on the connecting line therebetween.

In FIG. 8, the reference numeral 1 denotes a recording device capable of recording analog RGB video signal, 11 denotes a recording an signal processing portion for applying recording processing to the video signal, 12 denotes a video signal converting portion, 13 denotes a recording operation inputting portion for input a recording command signal, and 14 denotes a switching portion for switching the input of the video signal based on the recording command signal. The reference numeral 2 denotes a video display device for displaying the video signal, 21 denotes an identification signal generating portion for outputting an identification signal (hereinafter referred to as an ID signal) indicating performance etc. of the video display device, 22 denotes a video signal processing portion, and 23 denotes a video signal display portion. The reference numeral 5 denotes a storage medium in which at least digital information by such as video information is stored, which is a recording disk, for example. The reference numeral 6 denotes a reconstructing device for reconstructing the digital signal from storage medium, e.g, the recording disk 5.

The reference numeral 3 denotes the body of a computer, 31 denotes a digital reconstruction processing portion for performing signal processing on the signal reconstructed in the reconstructing device 6, and 32 denotes a CPU (Central Processing Unit) for controlling the computer. The reference numeral 4 denotes an analog video signal output processing portion provided in the computer 3 for performing processing such as analog conversion to the digital video signal, 41 denotes an identification signal distinguishing portion for identifying an ID signal inputted from external equipment connected to the computer 3, 42 denotes a video data analog converting portion for applying analog conversion processing to the digital signal reconstructed from the recording disk 5, and 43 denotes a screen display resolution setting portion for setting the screen display resolution according to the range of the video signal which the display device can display.

Next, operation of the above structure is described. When recording the video signal outputted from the analog RGB terminal of the video output device, or the computer, the devices may be connected as shown in FIG. 8.

Described here is a process in which the video signal outputted from the analog video signal output portion 4 of the computer 3, or the video output device, is converted into a signal which is recordable in the recording device and then recorded.

In the case of the video display/record system shown in FIG. 8, the ID signal outputted from the identification signal generating portion 21 in the display device 2 by the DDC system is inputted into the computer 3. This enables the computer 3 to select a video signal within range displayable by the display device 3. When a previously set display resolution is out of the range, the closest resolution is selected in the range to output the video signal.

As stated above, in a conventional video input/output system formed of the computer 3, the recording device 1, and the video display device 2, the equipment connected to the computer 3 is recognized as a video display device by the DDC system and therefore the displayable range (resolution, frequencies of vertical/horizontal synchronizing signals, etc.) of the video signal outputted from the computer 3 is adapted to the specification of the video display device. Accordingly, the video signal may be outputted from the computer 3 in a display range (resolution, frequencies of vertical/horizontal synchronizing signals) which cannot be recorded by the recording device. This causes a first problem that, when recording with a recording device, it is necessary to provide a command, via the CPU 32, to the screen display resolution setting portion 43 to change the displayable range of the video signal outputted from the computer 3 to such video signal as can be inputted to the recording device.

Furthermore, even if the recording disk 5 is copy-protected, the analog RGB video signal is always outputted from the analog video signal output processing portion 4. The analog RGB video signal outputted from the analog video signal output processing portion 4 can therefore be inputted to the recording device, which causes a second problem in that the recording device 1 can easily record or copy the video signal even if the video source outputted from the analog video signal output processing portion 4 (the video output device) is copy-inhibited to protect copyright or secret information.

SUMMARY OF THE INVENTION

According to the present invention, a recording device for recording a video signal on a storage medium comprises: an identification signal generating portion for generating a first identification signal indicating performance of the recording device; and an identification signal switching portion receiving at least one second identification signal outputted from an external device connected to the recording device and indicating performance of the external device, and the first identification signal, for outputting one of the first identification signal and the second identification signal as a control signal to the external device depending on whether recording operation is performed or not.

According to the present invention, a video signal output device comprises: a copy flag detecting portion for detecting a signal indicating copy protect from a digital video signal including the signal indicating copy protect and digital video data; an identification signal distinguishing portion receiving and distinguishing an identification signal outputted from at least one external device externally connected to the video signal output device and indicating performance of the at least one external device; a screen display resolution setting portion receiving the digital video data read from the digital video signal and for setting a displayable range of the digital video data in accordance with each of the at least one external device on the basis of a result of distinction made in the identification signal distinguishing portion; a video data analog converting portion connected to the screen display resolution setting portion for converting the digital video data into an analog video signal; a signal output enable/disable determining portion for determining whether to output the analog video signal to the at least one external device on the basis of a result of detection in the copy flag detecting portion and a result of distinction in the identification signal distinguishing portion; and a video output determining portion connected to the video data analog converting portion and at least having a function of determining whether to output the analog video signal to the at least one external device in accordance with a result of determination in the signal output enable/disable determining portion.

According to the present invention, a signal processing method for a video display/record system comprising a video signal output device and at least one external device externally connected to the video signal output device comprises the steps of: (a) in the video signal output device, detecting an identification signal outputted from the at least one external device and indicating performance thereof; (b) checking a connection record of the at least one external device connected to the video signal output device on the basis of the identification signal; (c) setting a displayable range of video signal outputted from the video output device in accordance with the at least one external device when the at least one external device is different from a previously connected; (d) checking to see whether the at least one external device has a recording function; (e) when the at least one external device has no recording function, converting the video signal into an analog video signal and outputting the analog video signal from the video output device; (f) when the at least one external device has a recording function, reading a copy allowing/inhibiting flag indicating whether the video signal is copy-allowed or copy inhibited to determine whether the video signal can be copied; (g) when the video signal is copy-allowed, outputting the analog video signal from the video output device; and (h) when the video signal is copy-inhibited, determining in which form the analog video signal is to be outputted.

According to the present invention, the identification signals can be switched depending on whether or not the recording device performs a recording operation. This provides a recording device capable of sending appropriate control information to a device connected to the recording device depending on whether recording operation is performed.

According to the present invention, the identification signal switching portion can be switched on the basis of the recording standby signal. Accordingly, when the recording device performs recording, it is possible to send information about a video signal which can be input to the recording device to an external device connected to the recording device.

According to the present invention, when recording, information about the recording device can be automatically sent to an external device connected to the recording device, and when not recording, information about another external device connected to the recording device can be sent through the recording device.

According to the present invention, it is possible, with only a single input operation, to cause the recording standby signal generating portion to operate to output the recording standby signal, and to output a recording command signal, so as to send information about the recording device to a device connected to the recording device. The video signal can thus be reliable recorded.

According to the present invention, as the power-supply is turned on to operate the recording device, a standby command signal for commanding output of the recording standby signal is provided. Accordingly, it is possible, by only turning on the power-supply, to send information about video signals which can be input to the recording device to a device connected to the recording device.

According to the present invention, when only a device for outputting video (a video output device) is connected to the recording device, only the information based on the identification signal of the recording device is sent to the video output device. Therefore various conditions for the video signal and the like can be optimized between the recording device and the video output device connected to the recording device.

According to the present invention, it is possible to output the analog video signal in a scrambled form.

According to the present invention, when reconstructing from a copy-protected video software, outputting the video signal is not allowed if the device connected to the video output device cannot be identified. This reliably prevents the video software from being copied. When it cannot be determined whether the device connected to the video output device has a function of recording the information on the video software, the video signal is not outputted, thus reliably preventing the video software from being easily copied.

According to the present invention, when a recording device is connected to the video output device, it is possible to surely set the video signal within the displayable range which can be inputted to the recording device.

According to the present invention, a specific method is obtained for appropriately determining whether to output an analog video signal of video software depending on whether the video software is copy-protected and depending on the kind of the external device connected to the video output device.

The present invention has been made to solve the above-described first problem. An object of the invention is to provide a recording device, a video output device, a video display/record system and a signal processing method for the video display/record system in which the video output device can identify the recording device, and the displayable range (resolution, frequencies of horizontal/vertical synchronizing signals) of the video signal outputted from the video output device can be changed depending on whether the video signal is recorded or not to appropriately change the image display.

Further, the present invention has been made to solve the above-described second problem. An object of the present invention is to provide a recording device, a video output device, a video display/record system and a signal processing method for the video display/record system wherein the video signal outputted from the video output device is restricted in accordance with the type of video source and equipment connected thereto.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will now be described referring to the drawings.
<First Preferred Embodiment>

A first preferred embodiment of the present invention will now be described. In the block diagram shown in FIG. 1, the same reference numerals show the same components as those in the conventional example shown in FIG. 8.

Figure 1:
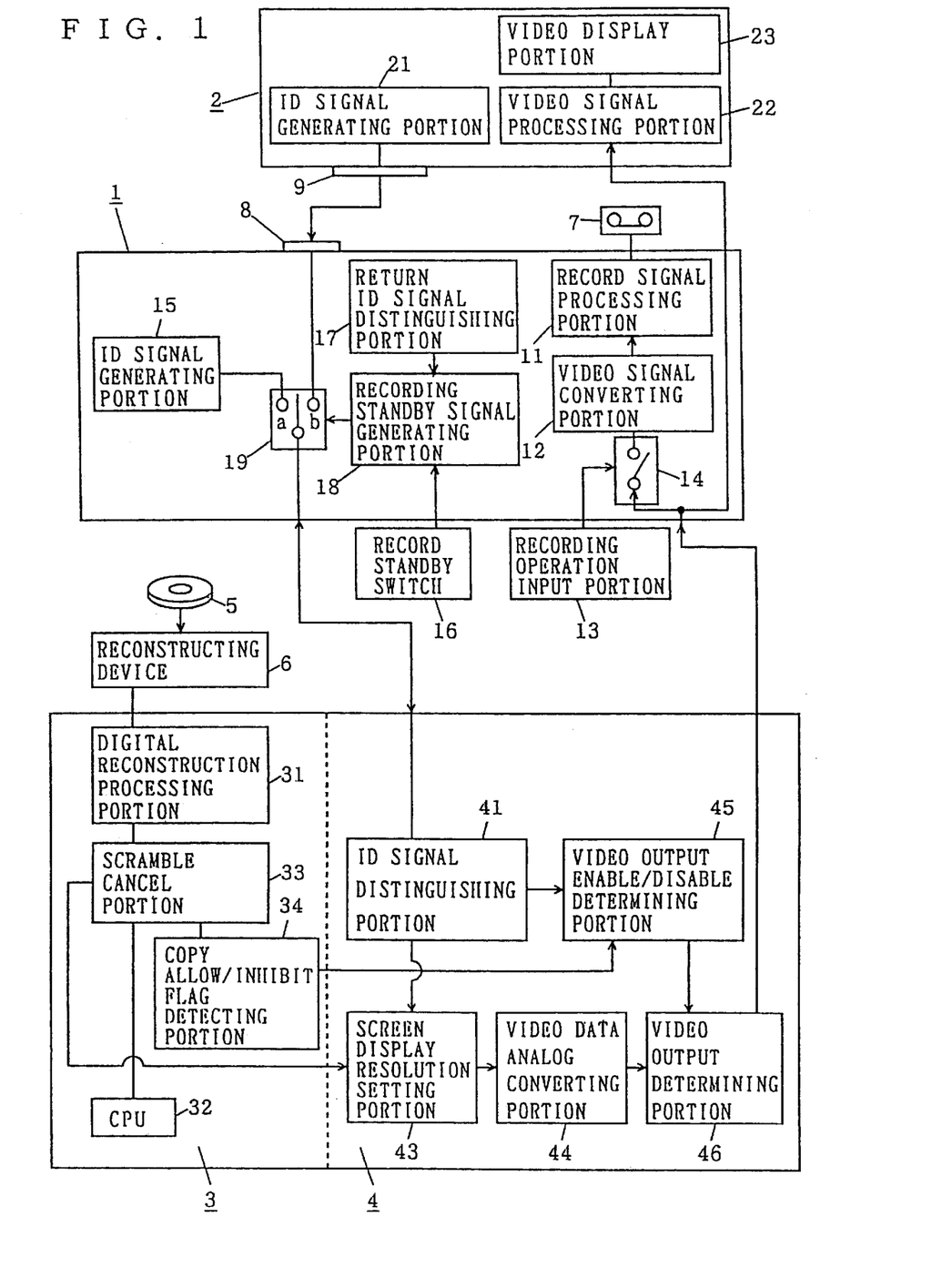
FIG. 1 is a diagram showing a video display system formed of a recording device, a video display device and a video output device according to a first preferred embodiment of the present invention.

FIG. 1 shows structures of a video signal output device and a recording device according to the present invention.

In FIG. 1, the reference numeral 1 denotes a recording device capable of recording an analog RGB video signal, 8 denotes a connector output portion, 11 denotes a record signal processing portion for performing recording processing to the video signal, 12 denotes a video signal converting portion for converting the RGB video signal inputted to the recording device 1 into a video signal of a NTSC system, 13 denotes a recording operation input portion for inputting a recording command signal, 14 denotes a switching portion for switching the input of the video signal on the basis of the recording command signal, 15 denotes an identification signal generating portion for generating an identification signal indicating performance etc. of the recording device, 16 denotes a recording standby switch (a record starting portion) which is operated prior to recording operation, 17 denotes a return identification signal distinguishing portion for distinguishing presence/absence of an identification signal from equipment connected to the connector output portion 8 of the recording device 1, 18 denotes a recording standby signal generating portion receiving the signal from the recording standby switch 16 and the signal from the return identification signal distinguishing portion 17 for checking the two signals to output a recording standby signal to instruct whether to enter recording operation, and 19 denotes a switching portion (an identification signal switching portion) for outputting one of the identification signals from the identification signal generating portion 15 and an external device connected to the connector portion in accordance with the signal from the recording standby signal generating portion 18.

The reference numeral 2 denotes a video display device for displaying the video signal, 21 denotes an identification signal generating portion for outputting an identification signal indicating performance etc. of the video display device 2, 22 denotes a video signal processing portion, and 23 denotes a video signal display portion.

The reference numeral 3 denotes the body of a computer, 31 denotes a digital reconstruction processing portion for applying signal processing to a signal reconstructed in the reconstructing device 6, 32 denotes a CPU (Central Processing Unit) for controlling the computer, 33 denotes a scramble canceling portion for canceling scramble processing if the recording disk 5 is scrambled for copy protection, and 34 denotes a copy allowing/inhibiting flag detecting portion for detecting whether the software reconstructed in the reconstructing device 6 is subject to copy protection.

The reference numeral 4 denotes an analog video signal output processing portion connected to the computer 3 for processing, e.g., analog-converting, the digital video signal, 41 denotes an identification signal distinguishing portion for identifying an ID signal inputted from external equipment connected to the computer 3, and 43 denotes a screen display resolution setting portion for setting the screen displayable range (resolution, frequencies of horizontal/vertical synchronizing signals, etc.) on the basis of the ID signal of the external equipment identified in the identification signal distinguishing portion 41.

The reference numeral 44 denotes a video data analog converting portion for analog-converting the digital signal reconstructed from the software, e.g., the recording disk 5 on the basis of a command for setting from the screen display resolution setting portion 43, 45 denotes a video output enable/disable determining portion for determining whether to enable or disable video output on the basis of the copy allowing/inhibiting flag and the ID signal of the external equipment, and 46 denotes a video output determining portion for scrambling the analog video signal outputted from the video data analog converting portion 44 or disabling the video output on the basis of the output from the video output enable/disable determining portion 45.

Next, operation of the first preferred embodiment constructed as described above will be described. A D-sub type connector adapted to the DDC standard i s used to connect the devices shown in FIG. 1, for example. In this structure, the ID signals (identification signals) of the devices according to the DDC system can be sent to the video output device by connecting the video output device and the recording device, and the recording device and the video display device through the connector.

Operation of the elements related to the recording device 1 and the video display device 2 in the system shown in FIG. 1 will be described.

In the recording device 1, the video signal converting portion 12 converts the analog RGB video signal (VGA image signal:Video Graphic Array image signal) outputted from the analog video signal output processing portion 4 in the computer 3 into an NTSC signal and the recording processing portion 11 records the signal into a storage medium such as the video tape 7. It can also output the analog RGB video signal in a through manner or output the video signal converted into the NTSC signal.

The analog RGB video signal outputted from the recording device 1 is processed in the video signal processing portion 22 in the video display device 1 and displayed as an image in the video display portion 23.

In the recording device 1, the switching portion 19 receives the ID signal from the identification signal generating portion 21 in the video display device 2 through the connector output portion 8. This ID signal indicates characteristic information of the video display device 2, such as the name of the manufacturer, the name of the model, the video displayable range (resolution, horizontal/vertical scanning frequencies) etc. The switching portion 19 also receives the ID signal outputted from the identification signal generating portion 15 in the recording device 1. This ID signal indicates characteristic information of the recording device 1, such as the name of the manufacturer, the name of the model, the range of the input-able video signal, etc.

The switching portion 19 is switch-controlled on the basis of the output from the recording standby signal generating portion 18. The recording standby signal generating portion 18 is supplied with the ID signal from the return identification signal distinguishing portion 17 and an ON/OFF signal of the recording standby switch 16.

Figure 2A:
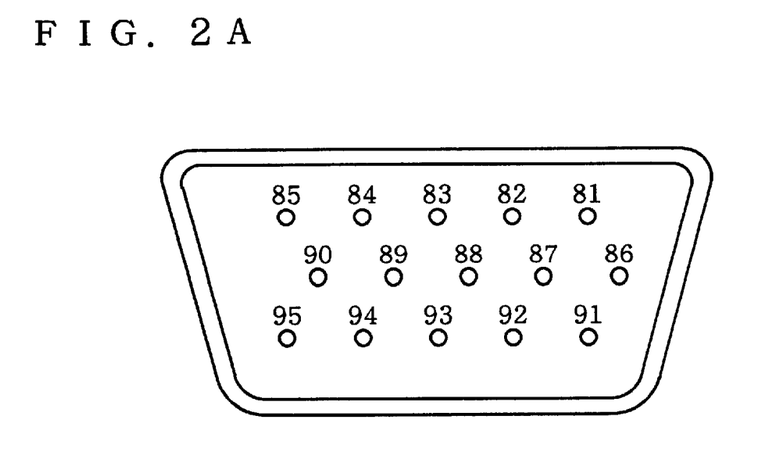
FIGS. 2A and 2B are diagrams showing the connector portion of the video display device.
Figure 2B:
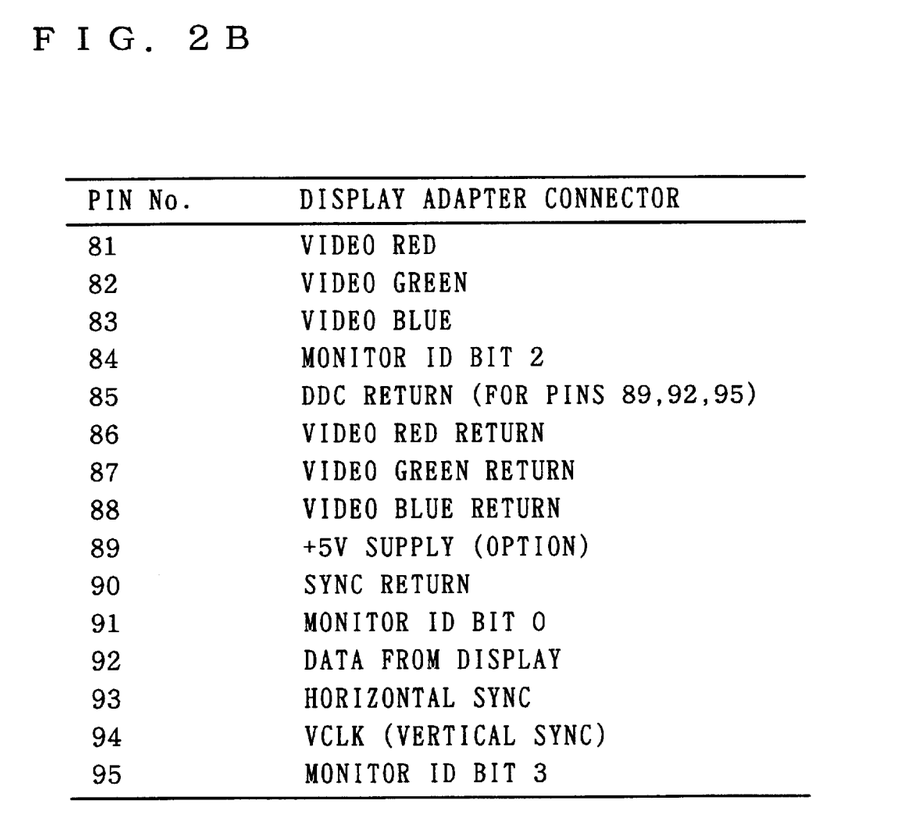

The identification signal is outputted from the connector 9 of the video display device 2. The connector 9 has the structure shown in FIG. 2A, whose signal inputs and outputs are related as shown in FIG. 2B.

When the ID signal indicating the video display device 2 is outputted from the return identification signal distinguishing portion 17 into the recording standby signal generating portion 18, the switching portion 19 is switched to the side-b so that the ID signal inputted to the recording device 1 is externally outputted as it is. The ID signal passed through the recording device 1 is inputted to the identification signal distinguishing portion 41 in the analog video signal output processing portion 4.

Next, when a recording standby ON signal is inputted from the recording standby switch 16 into the recording standby signal generating portion 18, the switching portion 19 is switched to the side-a independently of the presence/absence of the signal input from the return identification signal distinguishing portion 17, so that the ID signal of the recording device 1 from the identification signal generating portion 15 is outputted to the outside.

Suppose that the analog RGB video signal is recorded in the recording device 1. As for the screen display resolution of the video signal, the screen display resolution setting portion 43 in the analog video signal output processing portion 4 determines the resolution, the frequencies of the horizontal/vertical synchronizing signals, etc. on the basis of the ID signal from the video display device 2. Since the screen displayable range is thus set in accordance with the characteristics of the video display device 2, it is necessary when recording to reset it so that the video signal can be inputted to the recording device 1. Or, it is necessary to confirm whether the video signal can be inputted thereto. Provided for this purpose is the recording standby switch 16. The recording standby switch 16 is turned on before recording to cause the displayable range of the analog RGB video signal outputted from the analog video signal processing portion 4 to be changed.

Thus, when recording, the switching portion 19 is switched with a command from the recording standby switch 16 to input the ID signal of the recording device 1 into the identification signal distinguishing portion 41 in the analog video output portion 4 to instruct the screen display resolution determining portion 43 to change the setting of the display range so that the video signal can be inputted to the recording device 1. Then a recording command is inputted from the recording operation input portion 13 to start recording.

Since the recording device shown in this preferred embodiment is capable of input of VGA image signal (640×480 lines, fh:31.5 kHz/fv:60 Hz), for example, the screen display resolution setting portion 43 makes setting adapted to the VGA image signal.

The VGA image signal inputted to the recording device 1 is converted into NTSC signal (fh:15.75 kHz/fv:60 Hz) in the video signal converting portion 12 and is recorded into a storage medium, e.g., the video tape 7, in the record signal processing portion 11.

Although the description above has shown an example in which the screen display resolution of the video signal is set for the VGA image signal when the recording standby switch 16 is turned on, the setting of the display range is not limited to that adapted to the VGA image signal. The video signal can be converted into any video signal that the recording device can input or record.

According to this recording device, it is possible to selectirely output an ID signal of a device connected to the recording device or to output the ID signal of the recording device depending on whether recording is done or not. Further, when the externally connected device is changed, the ID signal of that device can be outputted. Hence, the video display mode can be switched to a suitable one on each occasion, which, unlike the conventional systems, eliminates the necessity of manually switching the video display mode every time the externally connected device is changed.

According to this recording device, the displayable range of the video signal outputted from the video output device (the computer 3 and the analog video signal output processing portion 4) can be automatically changed by turning on the recording standby switch. Accordingly, unlike in the conventional systems, it is not necessary to manually switch the video display mode.

Described next is operation of the elements related to the computer 3 and the analog video signal output processing portion 4 in the system shown in FIG. 1.

The video software such as the recording disk 5 is read in the reconstructing device 6 and the read digital video signal is inputted to the digital reconstruction processing portion 31. The digital video signal reconstructed in the digital reconstruction processing portion 31 is inputted to the scramble canceling portion 33. When the disk 5 is copy-protected or scrambled, the scramble canceling portion 33 cancels the processing and then outputs the digital video data. The digital reconstruction processing portion 31 and the scramble canceling portion 33 may be operation-controlled through the CPU 32 or may be operation-controlled in the scramble canceling portion 33.

The digital video data scramble-canceled in the scramble canceling portion 33 is inputted to the screen display resolution setting portion 43, and information indicating that the data had been scrambled is inputted to the copy allowing/inhibiting flag detecting portion 34. The copy allowing/inhibiting flag 5 detecting portion 34 detects the copy allowing/inhibiting flag and sends a signal indicating copy inhibition or a signal indicating copy allowance to the video output enable/disable determining portion 45.

The video output enable/disable determining portion 45 receives an ID signal indicating characteristics and performance of the externally connected equipment through the identification signal distinguishing portion 41 to acquire information about the externally connected equipment.

When the externally connected equipment is the recording device 1, the switching portion 19 selects the ID signal to output. The switching portion 19 is switched depending on whether recording operation is performed or not, so that the ID signal of the recording device 1 or an ID signal of a device connected to the recording device 1, e.g., the video display device 2, is externally outputted from the recording device 1.

The identification signal distinguishing portion 41 outputs the ID signal of the externally connected equipment to the screen display resolution setting portion 43. The screen display resolution setting portion 43 receives the ID signal to acquire information about the video displayable range that the externally connected equipment can deal with.

Figure 5:
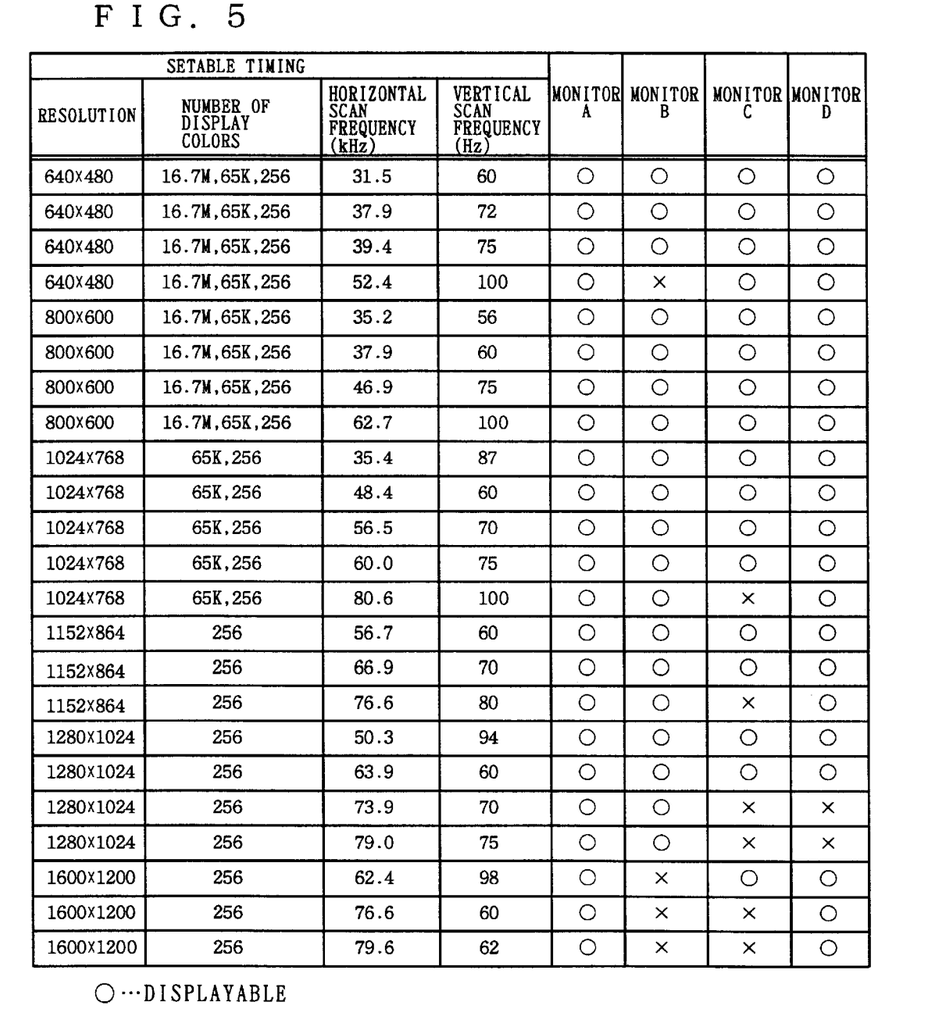
FIG. 5 is a diagram showing the displayable range of the video signal of the video display device.

The video display device can display the video ranges shown in FIG. 5, for example. The settings vary depending on the video display device. A resolution or horizontal/vertical scanning frequencies that can be set in the monitor A can, or cannot be set in the monitor B, monitor C, or the monitor D. Hence the screen display resolution must be set in accordance with the video display device. In FIG. 5, O indicates displayable and x indicates undisplayable.

The screen display resolution setting portion 43 sets the screen display resolution on the basis of the ID signal and the video data analog converting portion 44 converts the digital video data into analog RGB video signal. The analog RGB video signal is inputted to the video output determining portion 46, where it is determined whether to output the signal as the analog RGB video signal externally. This determination is made on the basis of the signal from the video output enable/disable determining portion 45 inputted to the video output determining portion 46.

The output from the video output enable/disable determining portion 45 is determined on the basis of the signals sent from the identification signal distinguishing portion 41 and the copy allowing/inhibiting flag detecting portion 34.

First, suppose that a signal indicating copy inhibition is inputted from the copy allowing/inhibiting flag detecting portion 34. At this time, if the ID signal of the video display device 2 is inputted from the identification signal distinguishing portion 41 to the video output enable/disable determining portion 45, the analog RGB video signal inputted to the video output determining portion 46 is outputted to the video display device 2 without being subjected to any special processing.

Next, if the ID signal of the recording device 1 is inputted from the identification signal distinguishing portion 41, the video signal output determining portion 46 stops outputting the input analog RGB video signal, or outputs the analog RGB video signal in a scrambled form.

When a signal showing that the disk 5 is copy-allowed is outputted from the copy allowing/inhibiting flag detecting portion 34, the video output enable/disable determining portion 45 outputs a signal for allowing the video signal to be outputted to the video output determining portion 46, independently of the source of the ID signal sent from the identification signal distinguishing portion 41.

As stated above, the video output enable/disable determining portion 45 recognizes whether the copy allowing/inhibiting flag indicates copy-allowed or-inhibited and also recognizes from which device the ID signal has come, to determine whether to output the video signal reconstructed from the video software, or the recording disk 5, from the video output device (the computer 3 and the analog video signal output processing portion 4).

With this structure, it is possible to stop outputting the analog RGB video signal of the video software from the video output device (the computer 3 and the analog video signal output processing portion 4) or to apply scramble processing to the analog RGB video signal when the reconstructed video software or the disk 5 is copy-protected. Then the recording device cannot record, or even if it can, the recorded image is visually unintelligible.

Figure 3:
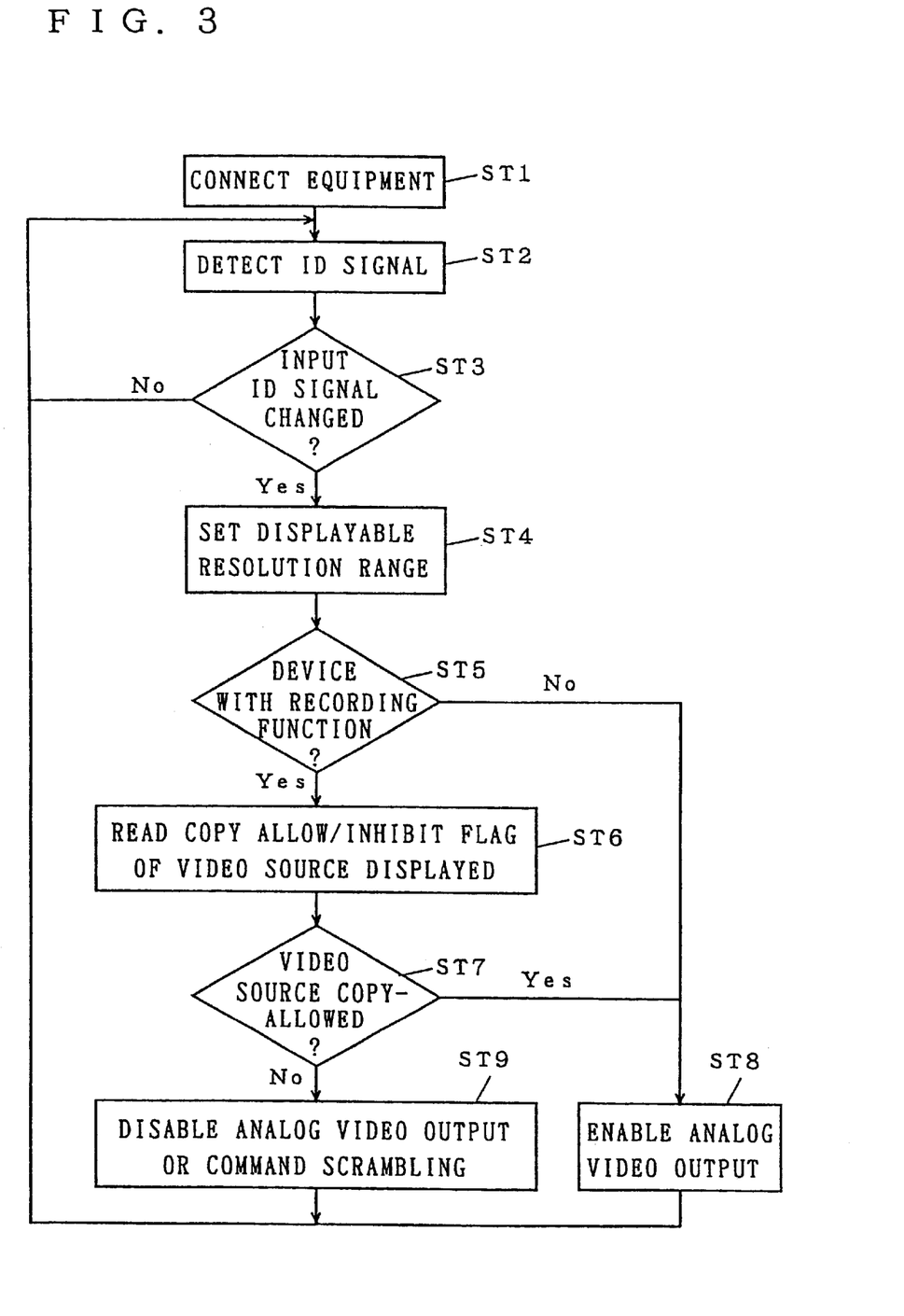
FIG. 3 is a flow chart showing processing in the video display system of the present invention.

FIG. 3 is a flow chart showing a flow of processing in the video display system formed of the video display device, the recording device, and the video output device shown in FIG. 1. Described next are the setting of the displayable resolution range of the video signal in this system and the processing of determining output of the analog RGB video signal.

First, another device is connected to the video output device (the computer 3 and the analog video signal output processing portion 4) in step ST1.

Next, an ID signal sent from the device connected to the video output device is detected and identified in the identification signal distinguishing portion 41 (step ST2).

The identification signal distinguishing portion 41 distinguishes the model of the device and also checks whether the device is the same as that connected thereto when video software was reconstructed last time to see if the connected device has been changed (step ST3). If the connected device has been changed and thus the ID signal has been changed, it instructs the screen display resolution setting portion 43 to restrict the video signal output within the video displayable range of the connected device (step ST4).

The video displayable range is classified as shown in FIG. 5, for example. With this operation, the video displayable range can be automatically changed when the connected device is changed. It is therefore not necessary to manually switch the video display mode, unlike in the structure connected on the basis of the signal distribution shown in the conventional example.

The identification signal distinguishing portion 41 also determines whether the device connected to the video output device has a recording function (step ST5). If it determines that the connected device doesn't have a recording function but displays the video in a real-time manner, like the video display device 2, it outputs the determination to the video output enable/disable determining portion 45 so that the video output enable/disable determining portion 45 provides an output enable signal for the analog RGB video signal to the video output determining portion 46 (step ST8).

If it is determined in step ST5 that the connected device has a recording function, the copy allowing/inhibiting flag detected in the copy allowing/inhibiting flag detecting portion 34 is read (step ST6). When the copy allowing/inhibiting flag, shows copy allowance, the result of determination is outputted to the video output exhale/disable determining portion 45 so that the video output enable/disable determining portion 45 provides the output enable signal for the analog RGB video signal to the video output determining portion 46 (step ST8).

When a recording command is inputted from the recording operation input portion 13 in the recording device 1, the picture displayed in the video display device 2 is recorded into a storage medium such as the video tape 7.

If the copy allowing/inhibiting flag checked in step ST7 shows that the video software is copy-protected, the video output determining portion 46 determines to stop outputting the analog RGB video signal, or to output it in a scrambled form (step ST9).

Subsequently, the flow returns to step ST2 to enter the mode for detecting the ID signal of the connected device and the operation in and after step ST3 for monitoring whether the connected device is changed is repeated.

A more specific example of actual operation will next be described.

For example, suppose that a video signal is being reconstructed from a copy-protected video software such as the recording disk 5 in the system connected as shown in FIG. 1 in a mode with a resolution of 800×600, with the recording standby switch 16 turned off. The copy allowing/inhibiting flag shows copy-inhibited, but the video signal is outputted to the video display device 2 since the ID signal from the external device connected to the video output device (the computer 3 and the analog video signal output processing portion 4) indicates the video display device 2 which displays the video in a real-time manner, so that the user can enjoy the video software.

Next, in order to record the video software, the user turns on the recording standby switch 16 to change the displayable range of the video signal so that the recording device 1 can record it. Then, the video output device changes the output video signal displayable range to the mode with a display resolution of 640×480 which can be recorded in the recording device 1. The resolution of the video signal recorded in the recording device 1 can be confirmed with this change in setting, but the video output determining portion 46 stops outputting the video signal since the currently reconstructed video software is copy-protected as stated above and the copy allowing/inhibiting flag therefore shows copy "inhibited." When the output of the video signal is stopped, the screen displays that this video software cannot be recorded to let the user know that he/she cannot record it.

Next, when the user gives up recording and turns the recording standby switch 16 off, the ID signal of the video display device 2 is inputted to the video output enable/disable determining portion 45 again. Then the video output determining portion 46 enables video signal output so that the user can see the video software with the video display device 2 again.

<Second Preferred Embodiment>

Figure 6:
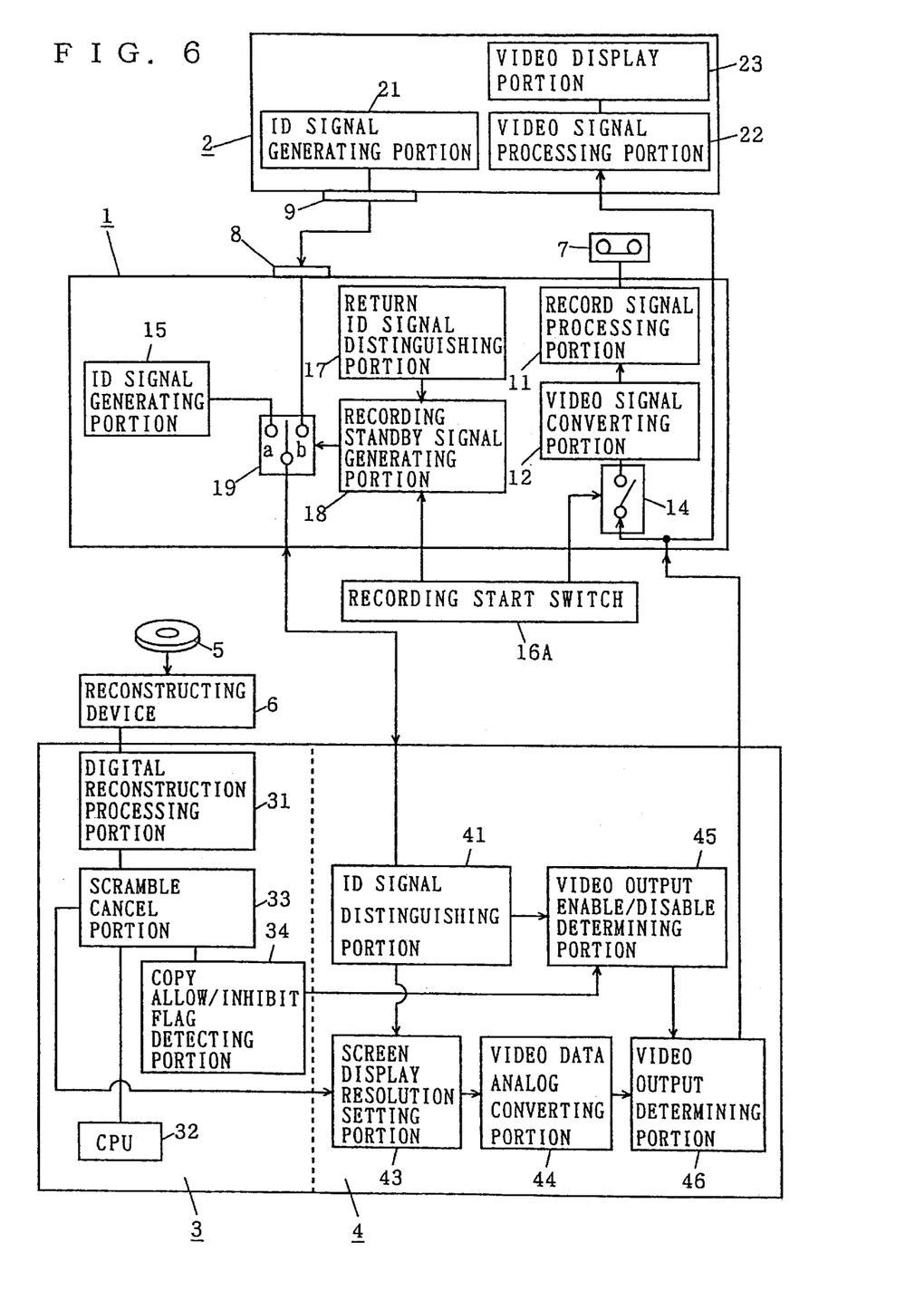
FIG. 6 is a diagram showing a video display system formed of a recording device, a video display device, and a video output device according to a second preferred embodiment of the present invention.

The first preferred embodiment, as depicted in FIG. 1, a structure in which the recording standby switch 16 is provided as an input portion separated from the recording operation input portion 13 for outputting a command for starting recording. However, it may be constructed, as shown in FIG. 6, as a recording start switch 16A (a record starting portion) having the functions of both of the recording standby switch 16 and the recording operation input portion 13.

When the recording start switch 16A is turned on, first, a recording standby ON signal is inputted to the recording standby signal generating portion 18 and the switching portion 19 is switched to the side-a so that the ID signal of the recording device 1 is sent from the identification signal generating portion 15 to the video output device (the computer 3 and the analog video signal output processing portion 4). Subsequently, a recording command is automatically applied to the switching portion 14 for switching input of the video signal. The video output device performs the individual steps described referring to FIG. 3, so that the video signal is set within the displayable range which is recordable in the recording device 1. Further, it selects whether to output the changed analog RGB video signal, or to stop outputting the analog RGB video signal, or to output the signal in a scrambled state. When the analog RGB video signal is outputted, the recording device 1 can record the video signal.

With the recording start switch 16A having both of the functions of the recording standby switch 16 and the recording operation input portion 13, it is possible to change the screen mode and make an instruction for recording with a single switch operation (input operation).

<Modification>

The structure may be constructed so that the screen displayable range can be set when the power-supply for the recording device 1 is turned on.

Figure 7:
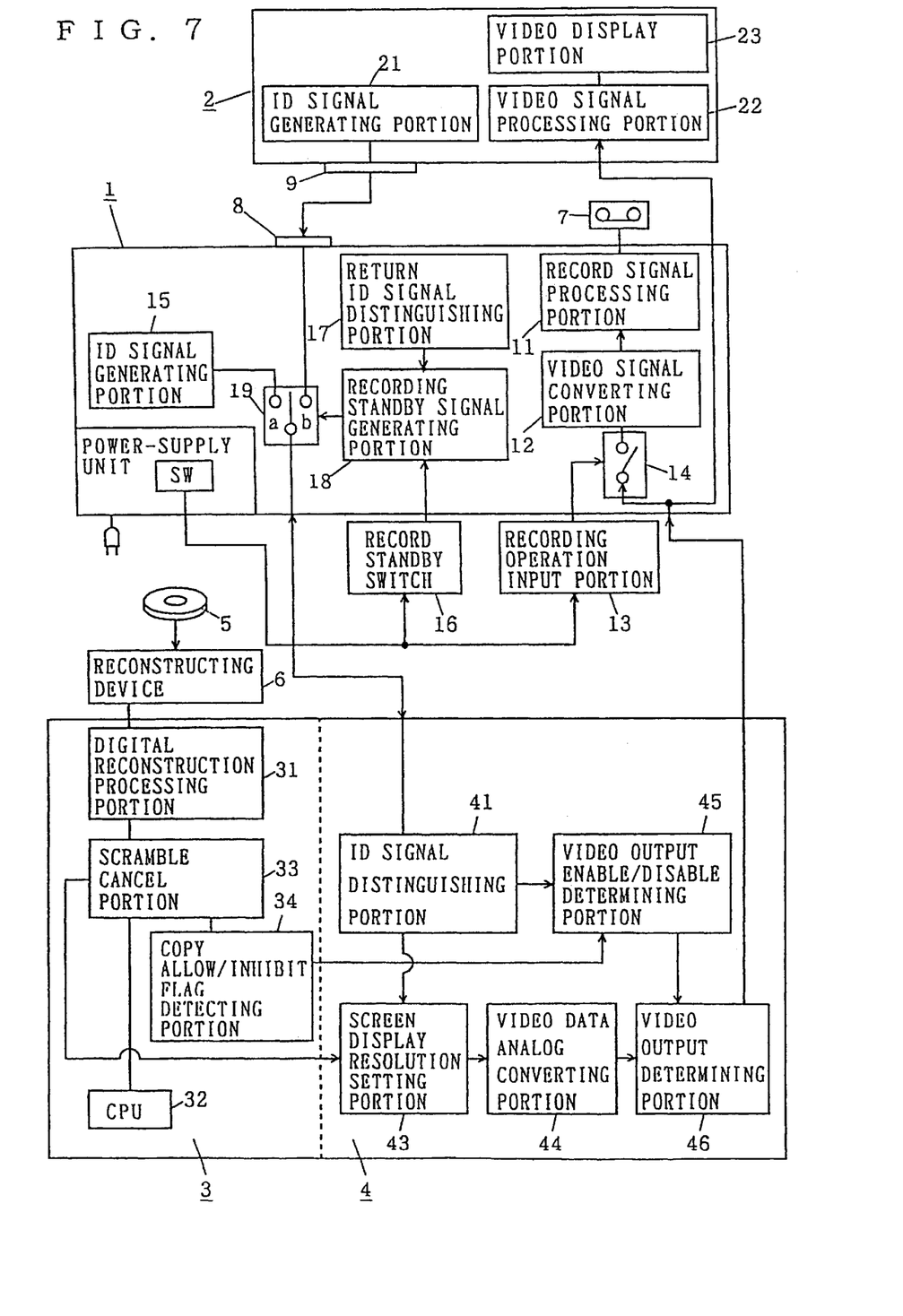
FIG. 7 is a diagram showing a video display system formed of a recording device, a video display device, and a video output device according to the second preferred embodiment of the present invention.

For example, a user may watch the video signal outputted from the video output device (the computer 3 and the analog video signal output processing portion 4) with the video display device without turning on the power-supply of the recording device. In this case, if the power-supply of the recording device is turned on, it is clear that it is turned on to record the video. Accordingly, if the recording standby switch 16 is electrically connected to a power-supply unit PU as shown in FIG. 7, the screen displayable range can be set at the same time when the power-supply of the recording device 1 is turned on.

This operation will next be described. When the power-supply of the recording device 1 is turned on (main power-supply ON), a switch SW built in the power-supply unit PU is turned on to give an electric signal to the recording standby switch 16. Then a recording standby ON signal is sent from the recording standby switch 16 to the recording standby signal generating portion 18, and the switching portion 19 is switched to the side-a so that the ID signal of the recording device 1 from the identification signal generating portion 15 is provided to the video output device (the computer 3 and the analog video signal output processing portion 4).

The video output device passes through the individual steps described referring to FIG. 3 to set the video signal within the displayable range which the recording device 1 can record and to select whether to output the analog RGB video signal, or to stop outputting the analog RGB video signal, or to output the signal in a scrambled form. When the analog RGB video signal is outputted, the recording device 1 can record the signal.

Since the video signal can be set within such a screen displayable range as can be inputted to the recording device 1 at the same time that the power-supply of the recording device 1 is turned on, the user can instruct the recording operation input portion 13 to give a command to start recording while watching the video signal in the video display device 2 with the same resolution as that of the video signal recorded in the recording device 1. Then the user will not confuse the recorded image and the image displayed in the video display device 2 since the video displayable range has been set before the recording operation.

When the displayable range is not set according to the recording device 1, the recording operation may be disabled, since the video signal is outputted in an output mode in such a range that the video display device can display and the selected resolution may be set out of the range of the video signal recordable in the recording device. The above-described structure can prevent this problem.

<Third Preferred Embodiment>

While the first preferred embodiment has shown a structure in which two devices, the recording device and the video display device, are connected to the video output device, the third preferred embodiment is directed to a structure in which only a recording device is connected thereto.

Only the recording device 1 may be connected to the video output device (the computer 3 and the analog video signal output processing portion 4), specifically the video display device 2 may not be connected in the following cases: For example, when a computer (the video output device) is used merely to control the hardware and an operator does not attend usually to the operation or it is controlled by remote operation with a communication system built in the computer, it is not always necessary to monitor the video output in a real time manner but it may be desirable to record the operating state.

For another example, when the video output of the computer can be displayed through another digital interface (I/F) (for example, a liquid crystal monitor can display the digital video data as it is without an analog I/F), it is not necessary to connect a video display device to the analog video output terminal. Then a recording device which can record the analog RGB video signal outputted from the video output device, e.g., the computer 3, may be connected to the analog video output terminal.

Figure 4:
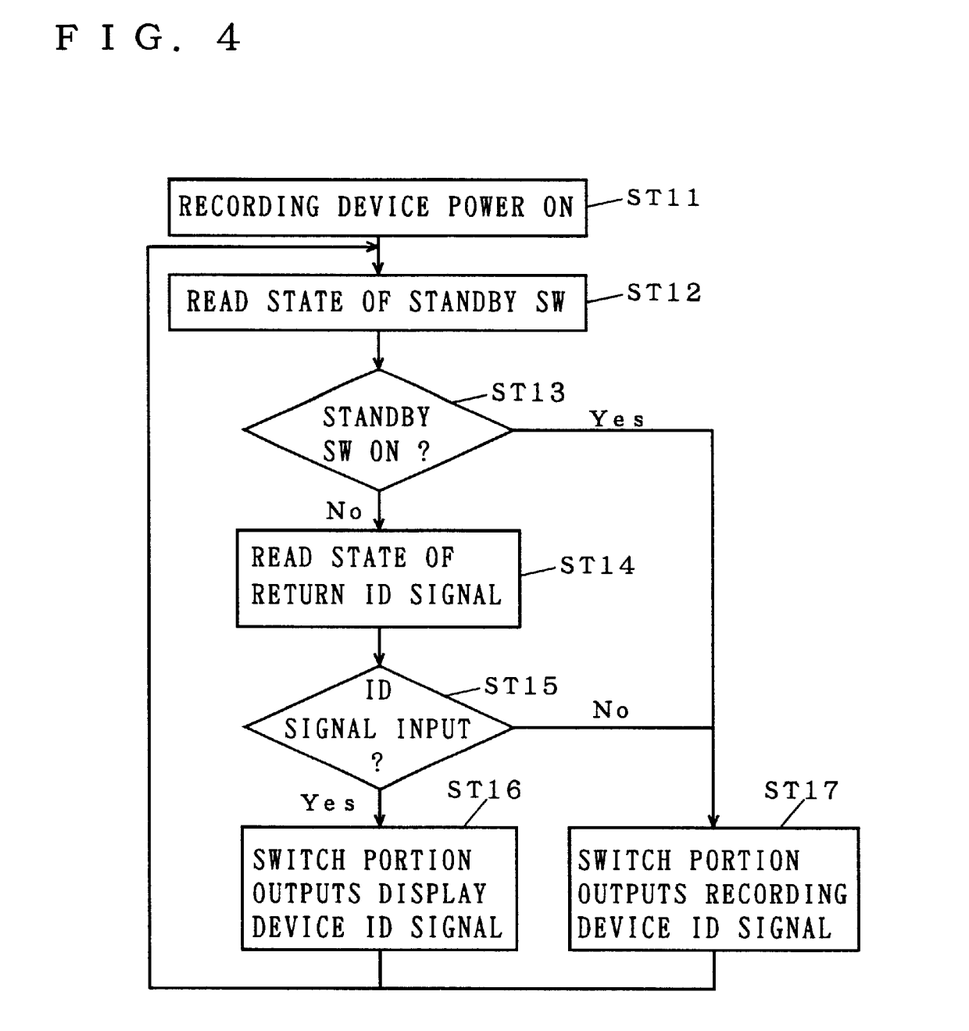
FIG. 4 is a flow chart showing processing in the video display system of the present invention.

Operation in the case where only the recording device 1 is connected to the video output device (the computer 3 and the analog video signal output processing portion 4) will be described referring to FIG. 1 and FIG. 4. FIG. 4 is a flow chart showing processing performed when only the recording device is connected to the video output device.

In this case, since no external device is connected to the recording device 1, only the ID signal of the recording device 1 is sent to the video output device. Accordingly, when the return identification signal distinguishing portion 17 detects absence of input of ID signal from the video display device 2 and determines that no device is connected to the recording device, the recording standby signal generating portion 18 may force the standby switch 16 to turn on, or the recording standby signal generating portion 18 may switch the switching portion 19 to the side-a so that the ID signal of the recording device 1 is always inputted to the video output device 3.

The processing will be described referring to the flow chart in FIG. 4.

The power-supply of the recording device 1 is turned on in step ST11 and the recording standby signal generating portion 18 reads input from the recording standby switch 16 (step ST12). Then the recording standby signal generating portion 18 determines whether the recording standby switch 16 is ON or OFF (step ST13).

When it is determined that the recording standby switch 16 is ON, the switching portion 19 is switched to the side-a and the ID signal of the recording device 1 is outputted to the video output device (the computer 3 and the analog video signal output processing portion 4: step ST17). The displayable range of the output video signal is then set so that the video signal can be recorded in the recording device.

If it is determined in step ST13 that the recording standby switch 16 is not ON, a return ID signal input from a device connected to the recording device 1 is read in the recording standby signal generating portion 18 (step ST14).

The recording standby signal generating portion 18 then determines presence/absence of input of the ID signal (step ST15). If it determines that no ID signal is inputted, the switching portion 19 is switched to the side-a and the ID signal of the recording device 1 is outputted to the video output device (the computer 3 and the analog video signal output processing portion 4: step ST17).

If it is determined in step ST15 that an ID signal is inputted, the switching portion 19 is switched to the side-b and the ID signal of the externally connected device (the video display device 2) is outputted to the video output device (step ST16).

It is thus determined whether a video display device is connected to the recording device, and when no device is connected, the ID signal of the recording device 1 is sent to the video output device 3 in a forced manner and setting of the displayable range of the video signal is changed.

When only the recording device 1 is connected, it is possible to always set the displayable range (resolution, frequencies of horizontal/vertical synchronizing signals) of the video signal outputted from the video output device 3 to the resolution recordable in the recording device 1. Accordingly, if video software is record-allowed (copy-allowed video software), it can be recorded with ease.

<Fourth Preferred Embodiment>

While the preferred embodiments described above relate to an operation in which devices connected to the video output device send the identification signal (ID signal), this preferred embodiment assumes that a device having no identification signal sending function, such as a device not adapted to DDC, is connected to the video output device. Operation of the video output device in the case where a DDC-unadapted device is connected will next be described.

When a DDC-unadapted device is connected to the video output device, the identification signal distinguishing portion 41 cannot identify it since no ID signal is sent from the device. However, it determines unidentifiable also when no device is connected or when a display device of an old model is connected.

When the identification signal distinguishing portion 41 determines unidentifiable (no DDC signal), a signal indicating that a device having a recording function is connected is sent to the video output enable/disable determining portion 45. The video output enable/disable determining portion 45 is supplied with the copy allowing/inhibiting flag read from the disk 5 from the copy allowing/inhibiting flag detecting portion 34. When the copy allowing/inhibiting flag indicates copy "inhibited," the video output determining portion provides a command to stop video output, and therefore the video is not outputted. A scrambled video signal may be outputted. When the copy allowing/inhibiting flag indicates copy "allowed," it is allowed to output the video signal.

With this structure, when a device connected to the video output device cannot be identified and if the video software is copy-protected, the video signal is not outputted or outputted in a scrambled form. This reliably prevents the video from being copied when a device which, as shown in this preferred embodiment, is not adapted to the copy protection system and does not have a function of sending an identification code (no ID signal output) is connected to the system.

As described above, according to the preferred embodiments of the present invention, in a structure formed of a video output device and a video display device, and a video recording device interposed between the two devices, equipment identification signals are outputted in such a way that they are switched depending on whether a recording operation is performed or the video from the output device is passed through the recording device. This structure enables the video signal output range to be restricted in accordance with the two kinds of devices, thereby eliminating the necessity of changing the display mode by troublesome manual setting.

Furthermore, a structure is realized in which output of a video signal is limited when the video source in the video signal output device is copy-protected for the purpose of protecting copyright or protecting secret information so that it cannot be easily recorded or copied.

Moreover, merely with a hardware structure having a video output enable/disable determining system built in the video output device and a change-over switch for the identification codes in the recording device, a system for automatically changing the display resolution and a system for applying copy-protected processing to copy-inhibited video software can be easily provided while using an existing display system as it is.

While the invention has been described in detail, the foregoing description is in all aspects illustrative and not restrictive. It is understood that numerous other modifications and variations can be devised without departing from the scope of the invention.

We claim:

1. A recording device for recording a video signal onto a storage medium, comprising:
   an identification signal generating portion for generating a first identification signal indicating performance of said recording device; and
   an identification signal switching portion receiving at least one second identification signal outputted from an external device externally connected to said recording device and indicating performance of said external device, and said first identification signal, for selectively outputting one of said first identification signal and said second identification signal as an external control signal based on whether or not a recording operation is performed by said recording device.

2. The recording device according to claim 1, wherein said identification signal switching portion outputs said first identification signal when a recording operation is performed by said recording device and outputs said second identification signal when a recording operation is not performed by said recording device.

3. The recording device according to claim 1, further comprising a recording standby signal generating portion for outputting a recording standby signal directing said recording device to enter a recording operation,
   wherein said identification signal switching portion switches whether to output said first identification signal or said second identification signal based on said recording standby signal.

4. The recording device according to claim 3, wherein said identification signal switching portion outputs said first identification signal when said recording standby signal is inputted from said recording standby signal generating portion and outputs said second identification signal when said recording standby signal is not inputted.

5. The recording device according to claim 3, further comprising:
   a record starting portion for outputting a standby command signal for commanding said recording standby signal generating portion to output said recording standby signal, and also outputting a recording command signal for commanding said recording device to record the video signal onto said storage medium,
   wherein said record starting portion outputs said standby command signal and said recording command signal in response to a single input operation.

6. The recording device according to claim 3, further comprising a record starting portion for outputting a standby command signal for commanding said recording standby signal generating portion to output said recording standby signal,
   wherein said record starting portion automatically outputs said standby command signal when a power-supply for operating said recording device is turned on.

7. The recording device according to claim 3, further comprising an identification signal distinguishing portion for distinguishing presence/absence of said second identification signal,
   wherein said identification signal distinguishing portion instructs said recording standby signal generating portion to input said recording standby signal to said identification signal switching portion when distinguishing absence of said second identification signal.

8. A video signal output device, comprising:
   a copy flag detecting portion for detecting a signal indicating copy protect from a digital video signal including said signal indicating copy protect and digital video data;
   an identification signal distinguishing portion receiving and distinguishing an identification signal outputted from at least one external device externally connected to said video signal output device and indicating performance of said at least one external device;
   a screen display resolution setting portion receiving said digital video data read from said digital video signal and for setting a displayable range of said digital video data in accordance with each of said at least one external device on the basis of a result of distinction made in said identification signal distinguishing portion;
   a video data analog converting portion connected to said screen display resolution setting portion for converting said digital video data into an analog video signal;
   a signal output enable/disable determining portion for determining whether to output said analog video signal to said at least one external device on the basis of a result of detection in said copy flag detecting portion and a result of distinction in said identification signal distinguishing portion; and
   a video output determining portion connected to said video data analog converting portion and at least having a function of determining whether to output said analog video signal to said at least one external device in accordance with a result of determination in said signal output enable/disable determining portion.

9. The video signal output device according to claim 8, wherein said video output determining portion further comprises a function of determining whether to add said signal indicating copy protect to said analog video signal in accordance with a result of determination in said signal output enable/disable determining portion.

10. The video signal output device according to claim 8, wherein said identification signal distinguishing portion further comprises a function of outputting a signal indicating that said at least one external device is a device capable of recording said analog video signal to said signal output enable/disable determining portion when said identification signal indicating performance is not provided from said at least one external device or when said identification signal cannot be identified.

11. The video signal output device according to claim 8, wherein said at least one external device includes a recording device and another external device, wherein said screen display resolution setting portion further comprises a function of changing said analog video signal outputted in accordance with performance of said another external device to a displayable range adapted to said recording device when an identification signal indicating performance of said recording device is inputted to said identification signal distinguishing portion.

12. A signal processing method for a video display/record system comprising a video signal output device and at least one external device externally connected to said video signal output device, comprising the steps of:

(a) in said video signal output device, detecting an identification signal outputted from said at least one external device and indicating performance thereof;

(b) checking past record of connection of said at least one external device connected to said video signal output device on the basis of said identification signal;

(c) setting a displayable range of video signal outputted from said video output device in accordance with said at least one external device when said at least one external device is different from a device connected last time;

(d) checking to see whether said at least one external device has a recording function;

(e) when said at least one external device has no recording function, converting said video signal into an analog video signal and outputting the analog video signal from said video output device;

(f) when said at least one external device has a recording function, reading a copy allowing/inhibiting flag indicating whether the video signal is copy-allowed or -inhibited to determine whether the video signal can be copied;

(g) when said video signal is copy-allowed, outputting said analog video signal from said video output device; and (h) when said video signal is copy-inhibited, determining in which form said analog video signal is to be outputted.

* * * * *

UNITED STATES PATENT AND TRADEMARK OFFICE
CERTIFICATE OF CORRECTION

PATENT NO. : 6,243,530 B1
DATED : June 5, 2001
INVENTOR(S) : Naoki Kato

It is certified that error appears in the above-identified patent and that said Letters Patent is hereby corrected as shown below:

<u>Title page,</u>
Item [30], Foreign Application Priority Data, please correct the Japanese priority date from "Jun. 12, 1996" to -- Dec. 6, 1996 --.

Signed and Sealed this

Twenty-fourth Day of December, 2002

JAMES E. ROGAN
*Director of the United States Patent and Trademark Office*